US011422036B2

(12) United States Patent
Mainguet et al.

(10) Patent No.: US 11,422,036 B2
(45) Date of Patent: Aug. 23, 2022

(54) SENSOR AND DOUBLE INTEGRATION METHOD FOR CAPTURING THERMAL PATTERNS

(71) Applicants: COMMISSARIAT A L'ENERGIE ATOMIQUE ET AUX ENERGIES ALTERNATIVES, Paris (FR); IDEMIA IDENTITY & SECURITY FRANCE, Courbevoie (FR)

(72) Inventors: Jean-Francois Mainguet, Grenoble (FR); Joel Yann Fourre, Issy-les-Moulineaux (FR)

(73) Assignees: COMMISSARIAT A L'ENERGIE ATOMIQUE ET AUX ENERGIES ALTERNATIVES, Paris (FR); IDEMIA IDENTITY & SECURITY FRANCE, Courbevoie (FR)

( * ) Notice: Subject to any disclaimer, the term of this patent is extended or adjusted under 35 U.S.C. 154(b) by 237 days.

(21) Appl. No.: 16/923,589

(22) Filed: Jul. 8, 2020

(65) Prior Publication Data

US 2021/0018370 A1   Jan. 21, 2021

(30) Foreign Application Priority Data

Jul. 18, 2019 (FR) .................................... 19 08145

(51) Int. Cl.
*G01J 5/34* (2022.01)
*G06V 40/13* (2022.01)
*G01J 5/00* (2022.01)

(52) U.S. Cl.
CPC ............ *G01J 5/34* (2013.01); *G06V 40/1306* (2022.01); *G01J 2005/0077* (2013.01); *G01J 2005/345* (2013.01)

(58) Field of Classification Search
CPC ................. G01J 5/34; G01J 2005/0077; G01J 2005/345; G06V 40/1306
(Continued)

(56) References Cited

U.S. PATENT DOCUMENTS 4,394,773 A   7/1983   Ruell
4,429,413 A   1/1984   Edwards
(Continued)

FOREIGN PATENT DOCUMENTS

EP   2 385 486 A1   11/2011
EP   3 276 534 A1   1/2018
(Continued)

OTHER PUBLICATIONS

French Preliminary Search Report dated Apr. 27, 2020 in French Application 19 08145 filed on July 18, 2019 (with English Translation of Categories of Cited Documents), 2 pages
(Continued)

*Primary Examiner* — David P Porta
*Assistant Examiner* — Carolyn Fin
(74) *Attorney, Agent, or Firm* — Oblon, McClelland, Maier & Neustadt, L.L.P.

(57) ABSTRACT

Method for capturing a thermal pattern by a sensor comprising a plurality of pixels each comprising a heat-sensitive measuring element, the method comprising, for each pixel:
 heating the measuring element;
 first reading of the electrical charges outputted by the pixel during a first measurement duration and giving a first measurement value $x_1$;
 second reading of the electrical charges outputted by the pixel during a second measurement duration and giving a second measurement value $x_2$;
 calculating a difference $x_1 - \alpha \cdot x_2$, where $\alpha$ is a positive real number,
(Continued)

and wherein more than half of the heating duration is implemented during the first measurement duration and less than half of the heating duration is implemented during the second measurement duration.

15 Claims, 8 Drawing Sheets

(58) Field of Classification Search
USPC .................................................. 250/338.3
See application file for complete search history.

(56) References Cited

U.S. PATENT DOCUMENTS

| | | | |
|---|---|---|---|
| 6,091,837 A | 7/2000 | Dinh | |
| 6,289,114 B1 | 9/2001 | Mainguet | |
| 10,378,961 B2* | 8/2019 | Mainguet | G01J 5/34 |
| 10,909,345 B2* | 2/2021 | Mainguet | G01J 5/34 |
| 2016/0148034 A1* | 5/2016 | Kremin | G06V 40/1306 |
| | | | 382/124 |
| 2018/0032782 A1* | 2/2018 | Mainguet | A61B 5/1172 |

FOREIGN PATENT DOCUMENTS

| | | |
|---|---|---|
| EP | 3 502 639 A1 | 6/2019 |
| FR | 3 044 443 A1 | 6/2017 |
| FR | 3 069 938 A1 | 2/2019 |
| WO | WO 2017/093179 A1 | 6/2017 |
| WO | WO 2018/020176 A1 | 2/2018 |

OTHER PUBLICATIONS

U.S. Appl. No. 16/064,759, filed Jun. 21, 2018, 2019/0005296 A1, Mainguet, J, et al.
U.S. Appl. No. 16/230,162, filed Dec. 21, 2018, 2019/0195693 A1, Benwadih, M, et al.
U.S. Appl. No. 16/320,172, filed Jan. 24, 2019, 2020/0026897 A1, Mainguet, J, et al.
U.S. Appl. No. 16/579,327, filed Sep. 23, 2019, 2020/0103655 A1, Mainguet, J.
U.S. Appl. No. 16/657,493, filed Oct. 18, 2019, 2020/0124482 A1, Reivaux, A, et al.
U.S. Appl. No. 16/714,859, filed Dec. 16, 2019, 2020/0194653 A1, Mainguet, J, et al.
U.S. Appl. No. 15/900,505, filed Feb. 20, 2018, 2018/0240843 A1, Mainguet, J, et al.
U.S. Appl. No. 16/064,620, filed Jun. 21, 2018, 2019/0012513 A1, Mainguet, J, et al.
U.S. Appl. No. 15/779,738, filed May 29, 2018, Mainguet, J, et al.

* cited by examiner

SENSOR AND DOUBLE INTEGRATION METHOD FOR CAPTURING THERMAL PATTERNS

TECHNICAL FIELD AND PRIOR ART

This document concerns a thermal pattern sensor and a method for capturing thermal patterns. This document is advantageously used for carrying out a fingerprint capture by thermal detection.

It is known to produce a fingerprint sensor comprising heat detection means. These heat detection means may be pyroelectric capacitors, diodes, thermistors, or more generally any heat-sensitive element converting a variation in temperature to which the heat-sensitive element is subjected into a variation in an electrical parameter of the heat-sensitive element, such as an electrical potential at the terminals of the heat-sensitive element, an electric current generated by the heat-sensitive element or a variation in the electrical resistance of the heat-sensitive element.

Fingerprint detection can be carried out by so-called "passive" sensors which make use of a temperature difference between the finger and the sensor, as described in documents U.S. Pat. Nos. 4,394,773, 4,429,413 and 6,289,114. However, these sensors have the disadvantage of carrying out a measurement which depends only on this temperature difference. The situation can therefore arise where the signal level obtained at the output is zero because the finger and the sensor are at the same temperature, or where the contrast of the captured images varies, which then gives rise to problems during the subsequent digital processing of the captured images.

In order to eliminate these problems posed by passive thermal sensors, and also in order to be able to carry out a static acquisition where the finger does not move, so-called "active" sensors have been proposed, such as that described in documents U.S. Pat. No. 6,091,837 and EP 2 385 486 A1, for example.

In such an active sensor, each pixel comprises a pyroelectric capacitor formed of two conductive electrodes between which a portion of pyroelectric material is disposed, and a heating element. This heating element dissipates a certain quantity of heat in the pixel (in particular in the pyroelectric material portion) and the heating of the pixel is measured after a certain acquisition time with the finger present on the sensor.

At each pixel, it is possible to distinguish the presence of a ridge or a valley of the captured print depending on whether the heat provided by the heating element is absorbed by the skin (pixel in the presence of a ridge of the print) or retained in the pixel (pixel in the presence of a valley of the print). At the end of the acquisition time, the temperature of a pixel in the presence of the ridge, where the heat is absorbed by the skin, is lower than that of a pixel in the presence of a valley, where the heat is not absorbed by the skin and remains in the pixel.

To first order, such a sensor can measure the heat capacity, also known as the thermal mass or thermal capacity, of an element (the finger during a fingerprint capture) in contact with the pixels of the sensor. The measurements obtained also depend on the thermal conductivity between the pixels of the sensor and the portion of the element (ridge or valley in the case of a fingerprint) present on each pixel.

During a capture of a thermal pattern by an active heat detection sensor, all of the pixels of the sensor are read in the same way and in a regular manner at the same rate, in other words with an identical fixed measurement duration for all the pixels. This measurement duration, which corresponds to a time during which a pixel carries out the thermal measurement of the element that is in contact with it, is generally adjusted so as to obtain good contrast between the ridges and valleys of the fingerprint, in other words it is sufficiently long to obtain a signal level that is large compared with the noise. However, this measurement duration must not be too long for the total duration of the capture to remain acceptable to the user and for the measurement to not be disturbed by movements of the finger on the surface of the sensor.

The reading of the pixels carried out in an active heat detection sensor may correspond, for example, to a measurement of the charges generated in each pixel, which is implemented using a charge integrator, but other methods are possible depending on the heat detection means used.

An active heat sensor is sensitive to variations in temperature caused by the heating, but also remains sensitive to those induced by the difference in temperature between the finger present on the sensor and the sensor itself. The two signals generated by these two types of variation superimpose. The sensor is generally configured to have a so-called "active" signal, corresponding to the variations in temperature caused by the heating, which is much greater than the so-called "passive" signal that corresponds to the difference in temperature between the finger and the sensor. In other words, the variation in temperature induced by the heating is much greater than the variation in temperature due to the initial temperature difference between the finger and the sensor (and which could be almost zero if the sensor is, for example, at the same temperature as the finger).

FIG. 1 shows several successive images obtained during the reading of a fingerprint of a finger placed on then removed from an active thermal sensor. The images visible in FIG. 1 are numbered 1 to 12 and correspond to successive captures each separated by a duration of 40 ms with respect to the capture of the preceding image. In these images, the colour grey is used as a neutral colour reflecting the absence of generated charges, and black and white reflect the generation of positive or negative charges respectively according to whether the element located on the sensor is hotter or colder than the sensor.

When the finger is placed on the sensor, whether the sensor is an active or a passive heat sensor, if the temperature difference between the finger and the sensor is not zero, then positive or negative charges (depending on whether the finger is hotter or colder than the sensor and depending on the polarisation of the pyroelectric material) are generated in the regions where the finger is in contact with the sensor. Hence, in images 2 and 3 of FIG. 1, the ridges of the print which appear in black correspond to a part of the finger which comes into contact with the sensor. This large contrast reflects the large difference in temperature which exists at this time between the finger and the sensor.

The charges generated by the presence of the finger on the sensor appear on the captured images more or less rapidly and with more or less contrast depending on the reading speed of the sensor and the speed with which the finger is placed on the sensor. After reading of these charges by the imager, they disappear and are no longer visible on the following images. The contrast of the pattern related to these charges thus reduces on the following images.

Another phenomenon is produced just after the contact of the finger on the sensor. In image 3 of FIG. 1, a part of the ridges of the print which were already visible in image 2 have become white and not grey. Indeed, at the time of contact of the finger on the sensor, the pixels are strongly heated. This can be clearly seen in image 2, with ridges which appear in black because the temperature of the skin is a greater than that of the sensor during the capture of this image. The finger and sensor assembly then cools and this cooling translates into a generation of negative charges for the pixels in contact with the ridges which then appear in white.

A temperature equilibrium is then attained, as can be seen in FIGS. 5 and 6.

The opposite phenomenon is produced when the finger is removed, because the sensor tends to return to its initial temperature, if its substrate has a thermal mass greater than that of the finger and if it has not had sufficient time to heat it. This can be seen in images 7 and 8 of FIG. 1 in which the ridges of the print become white.

Moreover, the user is not totally stable when he places his finger on the sensor, and this phenomena of alternating passive contact and non-contact remains visible at the periphery of the print (see image 4 in which the parts of the ridges of the print at the periphery remain black and not grey unlike the other parts of the ridges of the print).

The same phenomenon is produced when the finger slides on the sensor; due to the presence of ridges and valleys, the skin is in contact and then not in contact from the point of view of a particular pixel, and variations are induced in the sensor.

Other stray phenomena also exist generating charges in the sensor, for example by the piezoelectric effect with variations in the pressure applied by the finger on the sensor, or even charges contributed by the coupling capacitance through the finger (for example signals with frequency equal to 50 Hz generated by the electromagnetic environment). These charges generated by these stray phenomena will be added to the charges generated by the "active" thermal effect and will therefore disturb the acquisition of images.

In order to limit the impact of stray phenomena on the sensor, it is possible to increase the heating power produced in the sensor, so as to make these signals negligible with respect to the useful signal. However, such a solution is not suitable for some applications, such as when the sensors are part of chip cards or connected objects which have only a little power for supplying the heating elements of the sensor, which does not allow the heating power to be sufficiently increased to the extent of significantly limiting the impact of the stray phenomena.

Another solution consists in reducing the measurement durations, in other words the integration times of the charges. Slow variations before the active heating will see their effects reduced because it is the temperature variation between the start and end of the measurement which is important. However, this solution is also unsatisfactory because it results in a decrease in the contrast obtained.

It is also possible to increase the duration of the heating carried out. Here too the solution is unsatisfactory because the signals coming from stray phenomena are increased at the same time as the heating duration.

Another solution consists in not retaining the first and last images of a capture when too many stray effects are observed. This solution is also unsatisfactory because energy has been unnecessarily wasted in order to capture the first and last images.

DISCLOSURE OF THE INVENTION

Thus there is a need to propose a sensor and a method for capturing a thermal pattern, limiting or removing the impact of stray phenomena on the captures carried out.

For this purpose, one embodiment proposes a method for capturing a thermal pattern using a sensor comprising a plurality of pixels each comprising at least one heat-sensitive measuring element, the sensor further comprising:

at least one heating element configured to heat the heat-sensitive measuring element of at least one pixel during a measurement by the heat-sensitive measuring element of said at least one pixel;

at least one reading circuit configured to read the electrical charges outputted by said at least one pixel during a measurement by the heat-sensitive measuring element of said at least one pixel;

the method comprising, for each pixel, the implementation of at least the following steps:

heating the heat-sensitive measuring element of the pixel during a heating duration starting at a time $t_0$ and ending at a time $t_2$ later than the time $t_0$;

first reading of the electrical charges outputted by the pixel during a first measurement duration starting at a time $t_1$ and ending at a time $t_3$ later than the time $t_1$, and giving a first measurement value $x_1$ corresponding to the electrical charges read during the first measurement duration $t_3-t_1$;

second reading of the electrical charges outputted by the pixel during a second measurement duration starting at a time $t_4$, later than the time $t_3$, and ending at a time $t_5$ later than the time $t_4$, and giving a second measurement value $x_2$ corresponding to the electrical charges read during the second measurement duration $t_5-t_4$;

calculating a difference $x_1-\alpha \cdot x_2$, with a corresponding to a positive real number, and wherein more than half of the heating duration is implemented during the first measurement duration and less than half of the heating duration is implemented during the second measurement duration.

In this method, the first reading of the electrical charges is implemented during more than half of the heating phase of the heat-sensitive measuring element of the read pixel. By contrast, the second reading of the electrical charges is implemented during less than half of the heating phase, and therefore at least partly during the cooling of the read pixel. During the cooling, a pixel in contact with the skin cools more quickly than a pixel without contact with the skin, in the opposite of the heating, and this after a certain time which depends on the thermal inertia of the pixel. The calculated difference then makes it possible to accumulate positive and negative charges obtained during the first and second readings, and thus to increase the measurement signal obtained at the end of the procedure. A better contrast is therefore obtained between the pixels which are in contact with the parts of different thermal conductivity of the element for which the thermal pattern is captured, for example between the pixels in contact with the ridges of the finger for which the fingerprint is captured and the pixels located opposite valleys of the finger for which the fingerprint is captured.

Moreover, the difference calculated from the two measurement values obtained makes it possible to reduce or even remove the signals due to stray phenomena whose contribution is identical throughout the two charge readings of identical duration.

Time $t_2$ occurs before time $t_5$ so that the second reading of the electrical charges outputted by the pixel is implemented at least partly during a cooling of the pixel read.

Time $t_2$ may be between times $t_1$ and $t_3$. In this case, the heating is stopped during the first reading, and the second reading is entirely implemented during a cooling phase of the pixel.

Advantageously, the method and the sensor may be configured to capture a fingerprint in contact with a capture surface of the sensor.

Here, a may be equal to the value of the ratio of the first measurement duration over the second measurement duration. In this case, the coefficient $\alpha$ makes it possible to compensate for a difference between the first and second measurement durations.

In a variant, the value of a may be different to that of the ratio between the first measurement duration and the second measurement duration.

Advantageously, the first measurement duration may be equal to the second measurement duration. This case is advantageous because the contribution of the stray phenomena is then identical in each of the first and second readings of the electrical charges. These stray phenomena are thus completely cancelled by means of calculating the difference $x_1 - x_2$ ($\alpha = 1$ in this case when a is equal to the value of the ratio of the first measurement duration over the second measurement duration).

The method may further comprise, after calculating the difference $x_1 - \alpha \cdot x_2$ for each of the pixels, a step of calculating an image of the captured thermal pattern from the values of differences $x_1 - \alpha \cdot x_2$ calculated for each pixel of the sensor.

The method may further comprise, between the first and second readings, a reset of the reading circuit or a reset of the pixel.

The method may be such that:
the value of the heating duration $t_2 - t_0$ is between approximately 60 µs and 5000 µs, or between 200 µs and 5000 µs (for example for a sensor carrying out a line-by-line reading of the pixels), or between 60 µs and 200 µs (for example for a sensor carrying out a pixel-by-pixel reading), and/or
each of the first and second measurement durations has a value of between approximately 60 µs and 5000 µs, or between 250 µs and 5000 µs (for example for a sensor carrying out a line-by-line reading of the pixels), or between 60 µs and 300 µs (for example for a sensor carrying out a pixel-by-pixel reading), and/or
times $t_0$ and $t_1$ are chosen so that the time between the start of the heating and the start of the first reading are between approximately 0 and 200 µs (for example for a sensor carrying out a line-by-line reading of the pixels), or between 0 and 100 µs (for example for a sensor carrying out a pixel-by-pixel reading).

Advantageously, $t_1$ is later than $t_0$, in other words the heating starts before the start of the first reading. However, it is possible that $t_0$ is later than $t_1$ or even equal to $t_1$, in other words that the heating starts after the start of the first reading or simultaneously with the start of the first reading.

The values given above are provided by way of indication. The values of the various durations indicated above depend on the characteristics of the sensor, and in particular on the sensitivity of the reading circuit, the size of each pixel and the various thicknesses of the layers and materials present in the sensor.

The method may be such that:
the first and second measurement values $x_1$ and $x_2$ are stored in the reading circuit, and the difference $x_1 - \alpha \cdot x_2$ is calculated in the reading circuit and then the result of this difference is outputted at the output of the reading circuit, or
the first and second measurement values $x_1$ and $x_2$ are outputted consecutively at the output of the reading circuit, and the difference $x_1 - \alpha \cdot x_2$ is calculated outside of the reading circuit.

The calculation of the difference $x_1 - \alpha \cdot x_2$ may be carried out outside of the reading circuit, in other words after having carried out an analogue-to-digital conversion of each of the measurement values $x_1$ and $x_2$.

In a variant, it is possible, after having carried out the first measurement, to retain the analogue measurement value $x_1$ in the reading circuit, for example in a first capacitor of the reading circuit. After having carried out the second measurement, the analogue measurement value $x_2$ is also retained in the reading circuit, for example in a second capacitor of the reading circuit. The analogue measurement values are then subtracted using the calculation of the difference $x_1 - \alpha \cdot x_2$, then the result of this subtraction is digitally converted and outputted by the reading circuit. This variant avoids calculating the subtraction outside of the reading circuit, and halves the number of data to be output, for the price of a bank of capacitors having the size of the number of simultaneously read pixels.

Each heat-sensitive measuring element may comprise at least one pyroelectric capacitor formed by at least one portion of pyroelectric material disposed between the first and second electrodes.

In this case, one of the first and second electrodes of the pyroelectric capacitor of each pixel may be formed by an electrically conductive portion common to all the pixels of the line to which said pixel belongs.

Moreover, the electrically conductive portion forming one of the first and second electrodes of all the pixels of a same line may also form the heating element of the pixels of the line.

In addition, the other of the first and second electrodes of the pyroelectric capacitor of each pixel may be formed by an electrically conductive portion common to all the pixels of the column to which said pixel belongs.

In a variant, each heat-sensitive measuring element may comprise at least one thermistor or at least one diode, and/or in each pixel, the heat-sensitive measuring element may form the heating element.

The reading circuit may comprise at least one amplifier, for example a differential amplifier installed as an integrator. The reading circuit may comprise at least one element producing a "Correlated Double Sampling" (CDS) in order to reduce the reading noise.

The heating element may be capable of heating, by the Joule effect, the heat-sensitive measuring element of each pixel, and/or the heating element may be capable of emitting light for heating the heat-sensitive measuring element of the pixels.

Another embodiment relates to a thermal pattern sensor comprising a plurality of pixels each comprising at least one heat-sensitive measuring element, the sensor further comprising:
at least one heating element configured to heat the heat-sensitive measuring element of at least one pixel during a measurement by the heat-sensitive measuring element of said at least one pixel;
at least one reading circuit configured to read the electrical charges outputted by said at least one pixel during a measurement by the heat-sensitive measuring element of said at least one pixel;

control means configured to implement a capture method as described above.

BRIEF DESCRIPTION OF THE FIGURES

The present invention will be better understood on reading the description of the embodiments, given purely by way of indication and in no way limiting, by making reference to the attached drawings, in which.

Identical, similar or equivalent parts of the various figures described below are given the same reference numbers in order to facilitate the passage from one figure to another.

The various parts shown in the figures are not necessarily on a uniform scale, in order to make the figures more readable.

The various possibilities (variants and embodiments) should be understood as not being exclusive from each other and can be combined together.

DETAILED DISCLOSURE OF THE SPECIAL EMBODIMENTS

Figure 1:
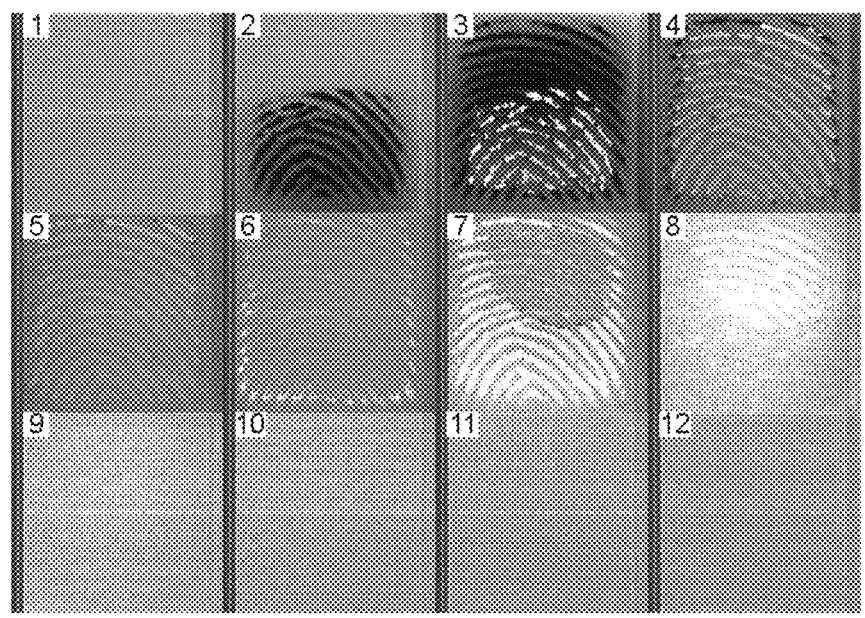
FIG. 1 shows a plurality of consecutive images obtained during the reading of a fingerprint of a finger placed on then removed from an active heat sensor of the prior art.
Figure 2:
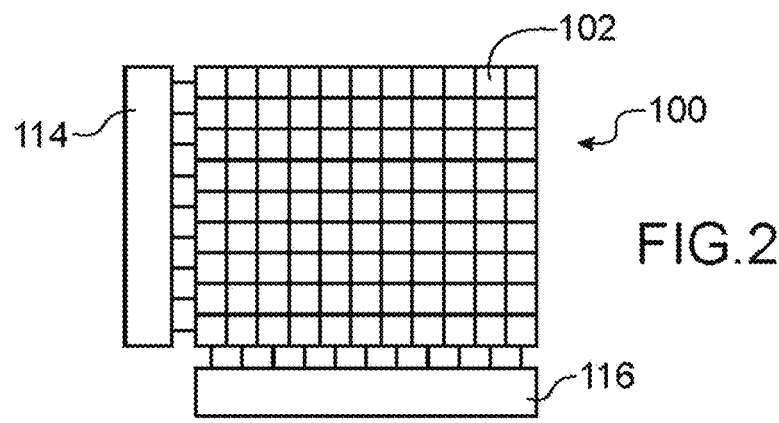
FIG. 2 schematically shows a thermal pattern sensor according to one embodiment.

The method for capturing a thermal pattern is implemented using a thermal pattern sensor 100 such as that schematically illustrated in FIG. 2.

The sensor 100 comprises a plurality of pixels 102, each pixel 102 comprising a heat detection element, or heat-sensitive measuring element.

According to a first configuration of the sensor 100, each pixel 102 comprises a pyroelectric capacitor 104 (visible in FIG. 3) which forms the heat-sensitive measuring element of the pixel 102.

The sensor 100 may be produced from a glass substrate, in particular when the sensor 100 comprises TFT transistors.

In a variant, the sensor 100 may be produced from a semiconductor substrate, for example silicon, in particular when the sensor 100 comprises transistors produced using MOS technology. According to another variant, the substrate used may be a flexible substrate, for example comprising polyimide or polyethylene naphthalate (PEN) or polyethylene terephthalate (PET), on which the elements of the sensor 100 are advantageously produced by printed technology.

The pixels 102 of the sensor 100 may be disposed forming an array with a plurality of lines and a plurality of columns of pixels 102, as is the case in the diagram of FIG. 2. The pitch of the pixels 102, in other words the distance between the centres of two neighbouring pixels 102, is, for example, between approximately 25 μm and 100 μm.

Figure 3:
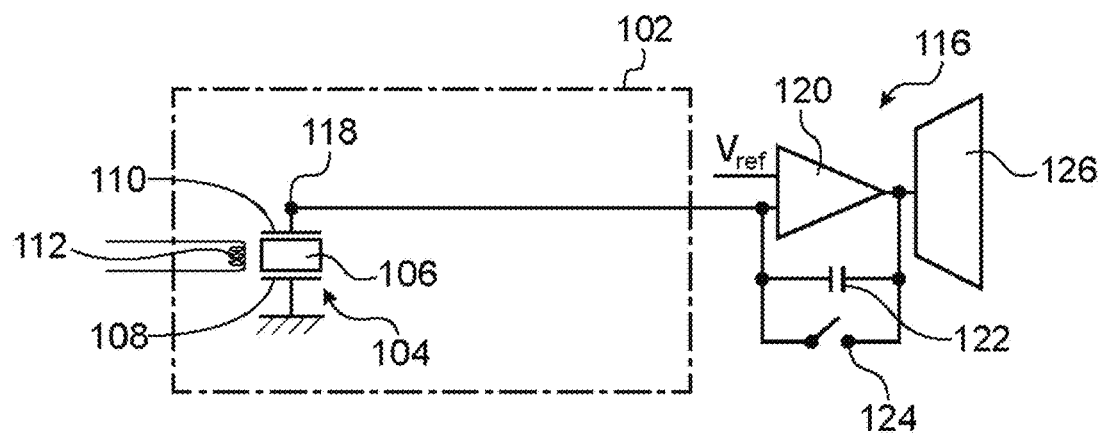
FIG. 3 shows a first exemplary embodiment of a reading circuit of a thermal pattern sensor according to one embodiment.

FIG. 3 describes the example of a pixel 102 using a pyroelectric capacitor 104 comprising a portion of pyroelectric material 106 disposed between a lower electrode 108 and an upper electrode 110. The pyroelectric material of the portion 106 is advantageously polyvinylidene fluoride or PVDF, or polyvinylidene fluoride-co-trifluoroethylene or P(VDF-TrFE). In a variant, the pyroelectric material may be AlN or PZT, or any other pyroelectric material suitable for forming the pyroelectric capacitor 104. The thickness of the portion 106 of pyroelectric material is, for example, between approximately 500 nm and 10 μm.

The electrodes 108, 110 each comprise at least one electrically conductive material, for example a metal material such as titanium of thickness equal to approximately 0.2 μm, and/or molybdenum and/or aluminium and/or a conductive oxide such as indium tin oxide (ITO) and/or a conductive polymer such as PEDOT:PSS. One of the electrodes, advantageously the upper electrode 110, or each of the two electrodes 108, 110, may be formed by stacking a plurality of electrically conductive materials, for example a Ti/TiN/AlCu stack. The thickness of each of the electrodes 108, 110 is between approximately 0.05 μm and 1 μm, for example.

The sensor 100 also comprises heating elements 112 dissipating a certain quantity of heat into the pixels 102, and in particular into the portion 106 of pyroelectric material. These heating elements 112 are, for example, conductive elements connected to one side or the other of the pyroelectric capacitors 104, advantageously formed from one of the conductive layers used to produce one of the electrodes 108, 110 of the pyroelectric capacitors 104.

A protective layer, corresponding for example to a layer of AlN or of any other material suitable for producing this layer, is disposed above the upper electrodes 110 of the pixels 102. The thickness of the protective layer may be between approximately 100 nm and approximately 100 μm. An upper face of the protective layer corresponds to the capture surface of the sensor 100 above which the thermal pattern to be detected is located, for example a finger of which the print is intended to be detected and which is in contact with this capture surface of the sensor 100.

According to an advantageous embodiment, one of the electrodes 108, 110 of the pyroelectric capacitor 104 of each of the pixels 102 of a same line of the array is formed by the same electrically conductive portion which is therefore common to all the pixels 102 of this line. Moreover, it is also possible that these electrically conductive portions common to the pixels of a same line also form the heating elements 112 of the pixels 102. The production details for producing such a sensor are described in document WO 2017/093179 A1.

Moreover, it is possible that the sensor 100 comprises an array of so-called "passive" pixels 102, in other words not comprising a transistor within the pixels 102, and with, in this case, the other of the first and second electrodes 108, 110 of the pyroelectric capacitor of each pixel 102 which is formed by an electrically conductive portion common to all the pixels of the column to which said pixel belongs. The production details for producing such a sensor are described in document WO 2018/020176 A1.

The heating element 112 is, for example, capable of heating, by the Joule effect, the heat-sensitive measuring element of each pixel 102. The heating of the portion 106 of pyroelectric material is attained in this case by circulating a current in the conductive element forming the heating element 112. The intensity of the heating obtained depends, in particular, on the intensity of the current passing through the conductive element.

The value of the heating voltage applied on the conductive element, and therefore the intensity of the current flowing in the conductive element, is adjusted with respect to the resistivity of the conductive material used in order to produce the thermal energy desired in the pixels 102. The power dissipated per pixel may advantageously be between approximately 0.05 mW and 1 mW.

In a variant, heating elements 112 other than resistive elements may be used, such as optical heating elements for example. For example, one or more LEDs such as laser diodes, may emit radiation which is transmitted via the substrate and absorbed by the pyroelectric material of the pixels 102, and/or by one of the electrodes 108, 110 of the pixels 102, and/or by a specific absorption layer, for example composed of partially oxidised ITO, carbon, chromium oxide, or even a polymer filled with coloured pigment, added near to one of the electrodes 108, 110 or directly on one of the electrodes 108, 110. For example, in the case of heating by infrared radiation, the titanium and/or ITO electrodes 108, 110 may be advantageously used to absorb this radiation. Advantageously, the radiation may be absorbed by the protective layer.

It is possible that one of the electrodes 108, 110 of all the pixels 102, for example the upper electrode 110 of all the pixels 102, together forms a continuous electrically conductive layer which should be insulated from the heating elements 112 by means of a dielectric layer. This continuous electrically conductive layer in this case forms a shielding layer which has the advantage of allowing switching on or off of the heating while the heat-sensitive measuring elements carry out an integration of electrical charges, without disturbing this integration of charges. Such a shielding layer also limits the disturbances undergone by the sensor 100, in particular those of frequency equal to 50 Hz.

In a variant, this shielding layer may be distinct from the electrodes 108, 110 of the pixels 102, and is, for example, disposed between the heat-sensitive measuring elements of the sensor 100 and the capture surface of the sensor 100.

According to other configurations of the sensor 100, it is possible that the heat-sensitive measuring elements of the sensor 100 are not pyroelectric capacitors, but are for example thermistors, diodes or any other suitable heat-sensitive element.

In addition to the heat-sensitive measuring elements, the sensor 100 also comprises control means 114 enabling control of the heating and of the reading phases of the pixels 102.

The sensor 100 also comprises a reading circuit 116 enabling reading of the electrical charges outputted at the output of each pixel 102, and therefore reading of the thermal pattern detected by the sensor 100.

In a variant, the sensor 100 may comprise a control circuit and reading 116 outside of the plane in which the array of pixels 102 is located.

FIG. 3 shows a first exemplary embodiment of a part of the reading circuit 116, and more precisely the electronic elements making it possible to read the electrical charges outputted by the pyroelectric capacitor 104 of one of the pixels 102 of the sensor 100.

The pixel 102 shown in FIG. 3 comprises the pyroelectric capacitor 104 formed by the portion 106 of pyroelectric material disposed between the two electrodes 108, 110. The lower electrode 108 is connected to ground and the upper electrode 110 forms a reading electrode of the pixel 102 and is connected to an active node 118 of the pixel 102.

When the heat-sensitive measuring element is, for example, a thermistor or any other heat-sensitive measuring element for which the current varies with temperature, this element also comprises a terminal connected to an active node 118 of the pixel 102.

The active node 118 is connected to an input of the reading circuit 116 located at the foot of the column of the array of pixels 102. In the example described here, the pyroelectric capacitors 104 of all the pixels 102 of a same column are connected in parallel to a same input of the reading circuit 116. This input of the reading circuit 116 corresponds to the inverting input of a reading amplifier 120 being, for example, a differential amplifier such as an operational amplifier. A polarisation electrical potential $V_{ref}$ is applied to the non-inverting input of the amplifier 120. The output of the amplifier 120 is looped back to its inverting input via a capacitor 122. A switch, 124 is connected in parallel with the capacitor 122 and makes it possible to short-circuit the capacitor 122 in order to reset the integrator to zero and discharge the capacitor 122. The output of the reading amplifier 120 is also connected to the input of a circuit 126 which may produce a CDS operation, then an amplification of the signal obtain and then an analogue-to-digital conversion.

When the heat-sensitive measuring elements of the sensor 100 correspond to thermistors, the thermistors of all the pixels 102 of a same column may be connected in series to a same input of the reading circuit 116. In this case, this reading circuit 116 is suitable for reading the current outputted. This reading circuit 116 comprises, for example, a resistor through which the outputted current passes. The current may be read via a voltage reader at the terminals of this resistor. Such a reading circuit 116 may also be used when the heat-sensitive measuring elements of the sensor 100 correspond to diodes.

The current integrator formed by the amplifier 120, the capacitor 122, and the switch 124 are common to all the pixels 102 of a same column. The circuit 126 may be common to all the pixels 102 of the sensor 100, by adding multiplexing electronic elements between the outputs of the reading amplifiers 120 and the circuit 126.

Figure 4A:
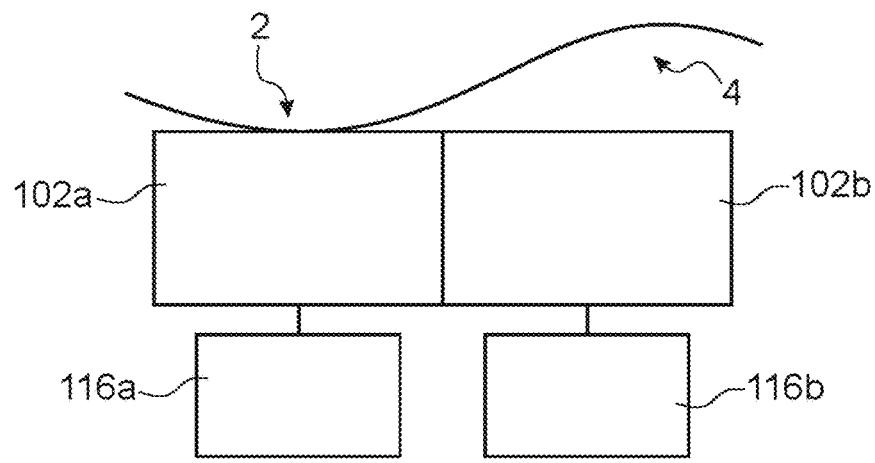
FIG. 4A shows two pixels of a thermal pattern sensor according to one embodiment.
Figure 4B:
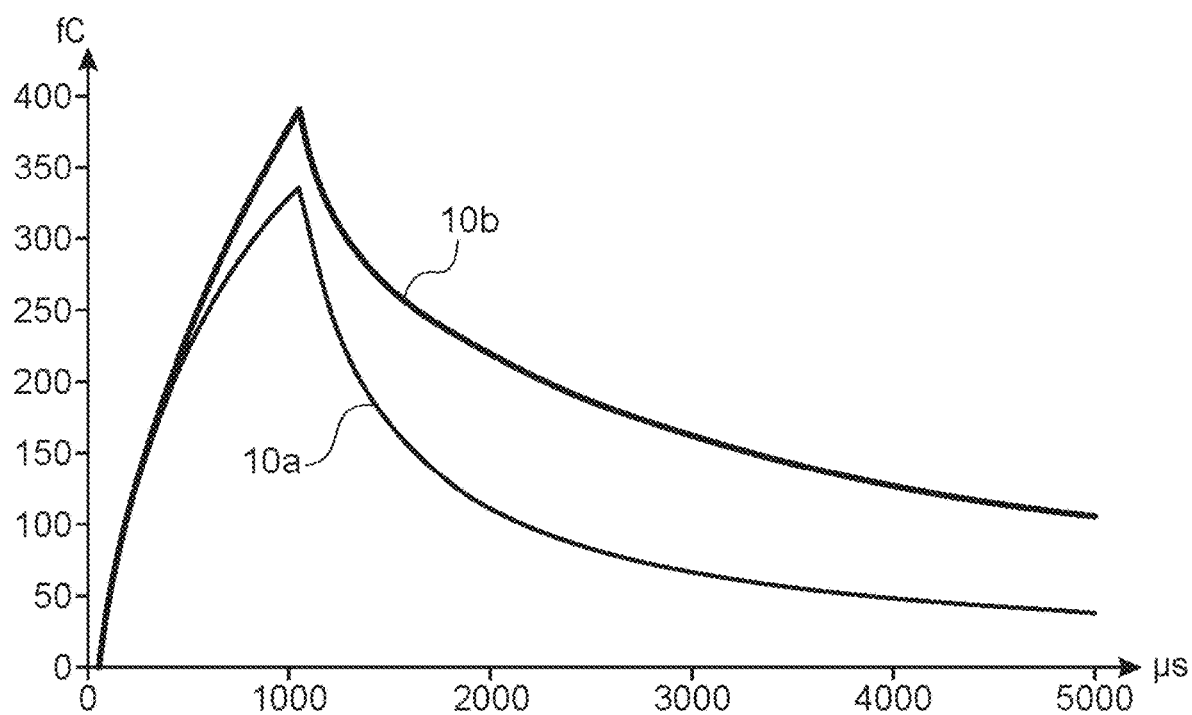
FIG. 4B shows signals obtained at the output of the two pixels visible in FIG. 4A, during and after a heating phase of the pixel.

In order to facilitate the understanding of the capture method implemented here, below in connection with FIGS. 4A and 4B, the temperatures of two pixels 102a, 102b will be described during and after a simultaneous heating phase of the two pixels 102a, 102b. The curve 10a shown in FIG. 4B corresponds to the signal outputted by the first pixel 102a on which a ridge 2 of a fingerprint is located, and curve 10b corresponds to the signal outputted by the second pixel 102b when a valley 4 of the fingerprint is present opposite or facing the second pixel 102b. There is therefore no contact between the skin and this second pixel 102b. The two pixels 102a, 102b correspond to two pixels 102 of the sensor 100.

The curves 10a and 10b represent the temperatures obtained when the heating starts at a time equal to 50 µs and is stopped at a time equal to 1050 µs.

During the heating, charges are generated in the two pixels 102a, 102b. Due to the fact that the voltage at the terminals of the pyroelectric capacitor of each pixel 102a, 102b is held constant by the current integrators of the reading circuits 116a, 116b, the charges are copied onto the capacitors 122 and thus the voltages at the terminals of the capacitors 122 increase. Moreover, due to the fact that the heat is absorbed by the skin of the ridge 2 of the print present on the first pixel 102a, the value of the voltage of the capacitor 122 of the first pixel 102a increases less than that of the second pixel 102b which is opposite the valley 4 and is therefore not in contact with the skin.

Figure 5:
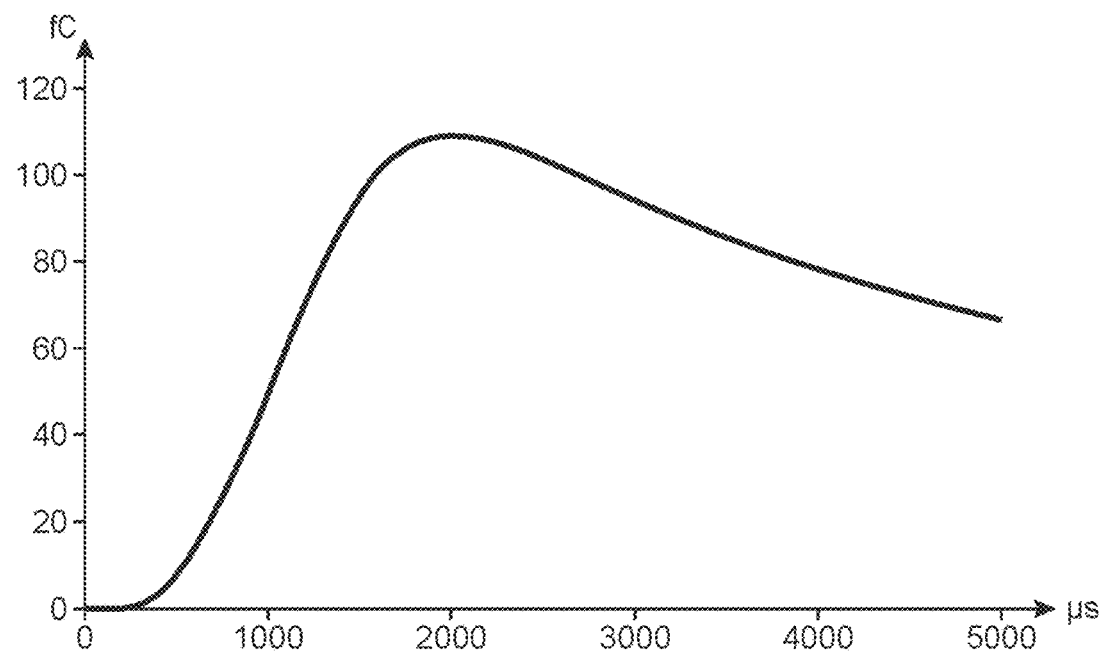
FIG. 5 shows the difference in the signal obtained between a pixel in which a valley of the print is located and a pixel on which a ridge of the print is located, during and after heating of the pixel.

The curve shown in FIG. 5 corresponds to the difference between the values of the measurement signals obtained between pixel 102b and pixel 102a, which represents the contrast between the two pixels 102a, 102b.

Due to the propagation time of the heat in a pixel which is heated, there is a certain thermal inertia in this pixel. This phenomenon is illustrated in FIG. 5 by the fact that the signal difference increases again after stopping the heating (it is produced at t=1050 µs), for a duration equal to 2000 µs in the example of FIG. 5. Then, it is observed that the slope of this curve becomes negative: the first pixel 102a cools less slowly than the second pixel 102b, and therefore the difference between the signals outputted by the two pixels 102a, 102b decreases.

Below, in connection with FIGS. 6 and 7, the capture method implemented according to a special embodiment is described.

Figure 6:
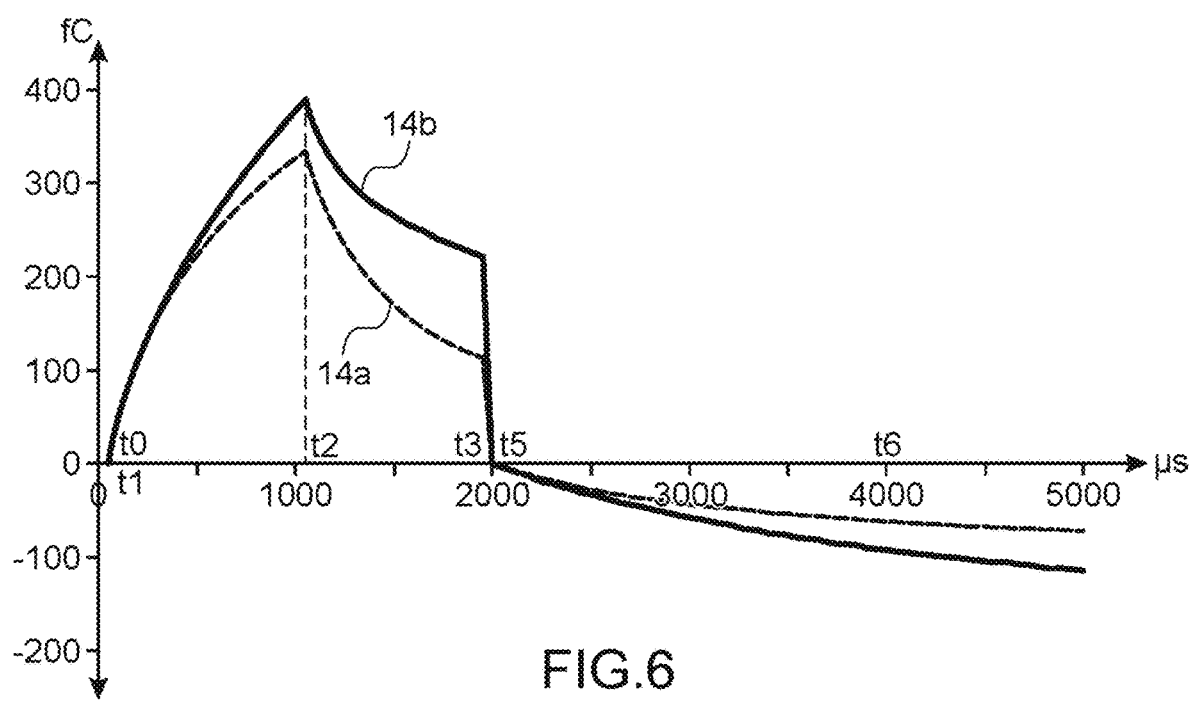
FIG. 6 shows the electrical charges obtained at the output of a pixel during a capture method according to one embodiment.
Figure 7:
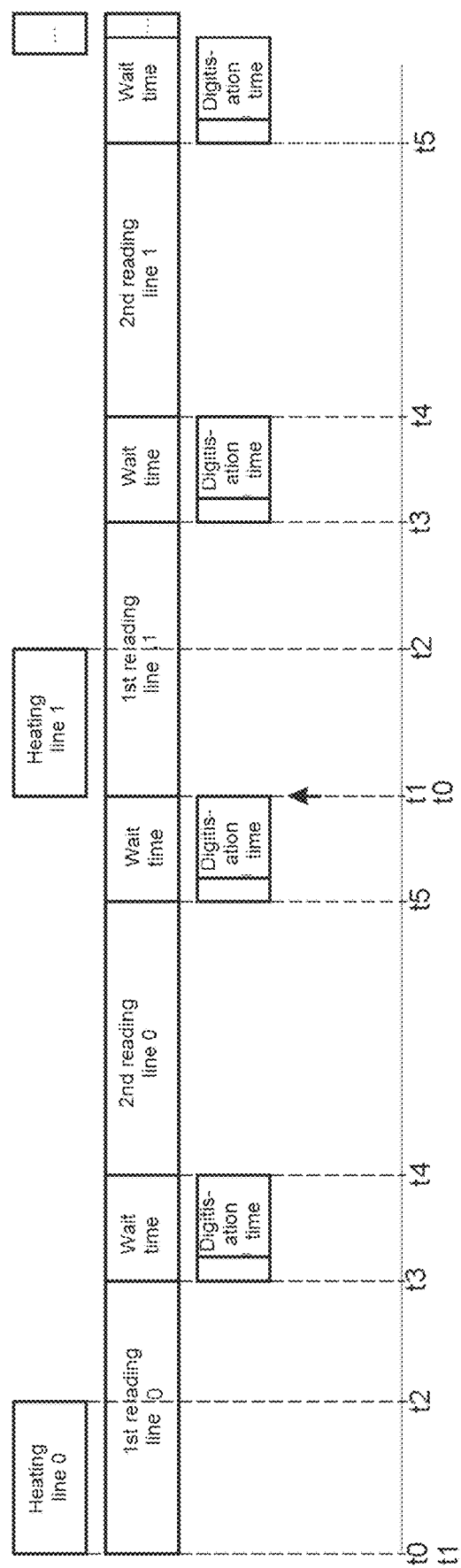
FIG. 7 shows, in the form of a timing diagram, the various steps implemented during a capture method according to one embodiment.

The curve 14a shown in FIG. 6 corresponds to the signal outputted by the first pixel 102a on which a ridge 2 of a print is located, and curve 14b corresponds to the signal outputted by the second pixel 102b opposite which a valley 4 of the print is located, during the implementation of the method. FIG. 7 shows, in the form of a timing diagram, the various steps implemented during the method.

The method described below is implemented line by line, in other words implemented simultaneously for all the pixels 102 of a same line of sensor. The steps are repeated for each of the lines of pixels of the sensor. Other implementation variants are however possible, for example by carrying out a reading pixel-by-pixel or pixel group by pixel group using groups of pixels which do not correspond to a single line of pixels.

For a reading circuit 116 as shown in FIG. 3, the switches 124 are closed beforehand. The integration capacitors 122 are then discharged, the potential at the terminals becomes zero and the potential at the output of the charge integrator therefore becomes equal to Vref.

The heating of the heat-sensitive measuring element of the pixels 102 of the line read starts at the time $t_0$ ($t_0$=50 µs in FIG. 6), by passing a current into the heating elements 112 of the pixels 102 read.

A first reading of the electrical charges outputted by the pixels 102 of the line read is then implemented during a first measurement duration starting at a time $t_1$ corresponding to the time at which the switches 124 of the pixels 102 of the line read open ($t_1$=$t_0$=50 µs in the example described here) and terminating at time $t_3$ when the value of the voltage of the capacitors 122 is read. The integration of the electrical charges generated in the pyroelectric capacitors of the pixels 102 of the line read is carried out during a first measurement duration. Since the switches 124 are open, the electrical charges generated by the pyroelectric capacitors of the read pixels 102 flow towards the capacitors 122 to which the read pixels 102 are connected.

Advantageously, the heating starts before the start of the first reading of the electrical charges in order to limit the electronic disturbances caused by the switching of the elements carrying out the heating. Moreover, the difference between the measurement signals of the two pixels 102a, 102b is negligible at the start of integration, the heat not having had the time to reach the surface of the sensor 100, the two pixels 102a, 102b therefore having a similar behaviour. However, it is conceivable that the heating starts after the start of the first reading of the electrical charges (with in this case $t_1$<$t_0$).

In a measuring element corresponding to a pyroelectric capacitor 104, the variation in charge ΔQ created is proportional to the variation in temperature ΔT undergone by the pyroelectric capacitor 104 and can be expressed by the following equation:

$$\Delta Q = \gamma \cdot S \cdot \Delta T,$$

where γ corresponds to the pyroelectric coefficient of the pyroelectric material 106 of the pyroelectric capacitor 104 and S the surface area thereof.

The temperature variation undergone by each of the pyroelectric capacitors 104 of the sensor 100 is different according to whether a ridge or a valley of the print is located above the pyroelectric capacitor. The variation in temperature undergone by a pyroelectric capacitor 104 on which a ridge of the print is located is called $\Delta T_{ridge}$, and the variation in temperature undergone by a pyroelectric capacitor 104 on which a valley of the print is located is called $\Delta T_{valley}$.

When the heat-sensitive measuring elements are thermistors or more generally heat-sensitive measuring elements generating a current, the value of which depends on the temperature, such as diodes for example, the current I obtained depends on the temperature according to a function f, in other words I=f(T). This current can also be expressed as a function of a particular measured value at a temperature $T_0$, with in this case I=$I_0 \cdot f(T_0, \Delta T)$.

At time $t_1$, the value of the current in a thermistor on which a ridge of the print is located, is called $I_{ridge\_t1}$ and the value of the current in a thermistor in which a valley of the print is located is called $I_{valley\_t1}$. The values of the currents generated by the thermistors are read at time $t_1$.

In the exemplary embodiment described here, during the first measurement duration, the heating is stopped. The heating is stopped at a time $t_2$. The heating duration $t_2$-$t_0$ is, for example, equal to 1000 µs.

Starting from the stopping of the heating (time $t_2$), the charges generated by the pyroelectric capacitors 104 of the read pixels 102 starts to decrease due to the fact that the pixels 102 cool. However, because of the thermal inertia existing in the sensor 100, the value of the contrast continues to increase (as described above in connection with FIG. 5) for a certain period after time $t_2$, in other words after having stopped heating. It is therefore advantageous to prolong the integration of charges during this period, until the contrast decreases.

The first reading of the generated charges is stopped at a time $t_3$. The first measurement duration (equal to $t_3$-$t_1$) is, for example, equal to 2000 µs. The value of the time $t_3$ may be chosen carefully such that the end of the first reading corresponds to the time when the contrast between a pixel 102 on which a ridge of the print is located and a pixel 102 on which a valley of the print is located starts to decrease (2000 μs in the example of FIG. 5). It is however possible to choose an integration duration, or measurement duration, close to the heating duration, for example between approximately 1000 μs and 1300 μs.

At the end of this measurement duration, the pyroelectric capacitors have been subjected to a certain variation in temperature, the electrical charges generated by the pyroelectric capacitor and stored by each of the capacitors 122 being the consequence of this temperature variation. The value measured by this first measurement is called $x_1$.

The electrical potential at the output of the amplifier 120 is thus $V_{out}=Q/C_{ref}+V_{ref}$, with Q corresponding to the electrical charges generated during the first measurement duration and $C_{ref}$ the value of the capacitor 122. This potential is then read and sampled by the analogue-to-digital converter of the circuit 126 or stored in another capacitor.

The value of the electrical charge generated by a pyroelectric capacitor 104 on which a ridge of the print is located at time $t_3$, is:

$$Q_{ridge\_t3}=\gamma \cdot S \cdot \Delta T_{ridge},$$

and the value of the electrical charge generated by a pyroelectric capacitor 104 on which a valley of the print is located at time $t_3$, is:

$$Q_{valley\_t3}=\gamma \cdot S \cdot \Delta T_{valley},$$

At time $t_3$, the contrast obtained between a pixel on which a ridge of the print is located and a pixel on which a valley of the print is located is therefore:

$$\text{Contrast}=Q_{ridge\_t3}-Q_{valley\_t3}$$

$$\text{Contrast}=\gamma \cdot S \cdot (\Delta T_{ridge}-\Delta T_{valley}).$$

The contrast obtained is therefore linear with respect to the difference in temperature variations between a pixel on which a ridge of the print is found and a pixel on which a valley of the print is found.

When the heat-sensitive measuring elements are thermistors (or more generally heat-sensitive measuring elements generating a current, the value of which depends on the temperature), the currents generated are read at times $t_1$ and $t_3$. The value of the current in a thermistor on which a ridge of the print is located, at time $t_3$, is:

$$I_{ridge\_t3}=I_{ridge\_t1} \cdot f(T_{ridge}, \Delta T_{ridge\_t3}),$$

and the value of the current in a thermistor on which a valley of the print is located, at time $t_3$, is:

$$I_{valley\_t3}=I_{valley\_t1} \cdot f(T_{valley}, \Delta T_{valley\_t3}).$$

Given that the function f is locally linear over the considered temperature domain, in other words variations less than a few degrees Kelvin, this function can be written in the form $f(T_0, \Delta T)=a(T_0+\Delta T)+b$. The difference in current between times $t_3$ and $t_1$ is:

$$\Delta I_{ridge\_t3}=I_{ridge\_t3}-I_{ridge\_t1}=I_{ridge\_t1} \cdot a \Delta T_{ridge\_t3},$$

$$\Delta I_{valley\_t3}=I_{valley\_t3}-I_{valley\_t1}=I_{valley\_t1} \cdot a \Delta T_{valley\_t3},$$

At time $t_3$, the contrast obtained between a pixel on which a ridge of the print is located and a pixel on which a valley of the print is located is therefore:

$$\text{Contrast}\_t_3=\Delta I_{ridge\_t3}-\Delta I_{valley\_t3}$$

By assuming that the initial temperatures of the ridge and valley pixels are substantially equal:

$$I_{ridge\_t1} \approx I_{valley\_t1} \approx I_{t1}$$

The contrast obtained can be written according to the equation:

$$\text{Contrast}\_t_3=a \cdot I_{t1} \cdot (\Delta T_{ridge\_t3}-\Delta T_{valley\_t3}).$$

The contrast obtained is therefore linear with respect to the difference in temperature variations between a pixel on which a print ridge is found and a pixel on which a print valley is found, as with the pyroelectric capacitors. The contrast obtained at the time $t_3$ has a positive value.

At the end of the first measurement duration, it is possible to provide a wait time (between times $t_3$ and $t_5$ in FIG. 7) during which the acquired data are output, converted, sampled etc. During this wait time, the switch 124 is switched to the closed position in order to discharge the capacitor 122. In FIG. 6, this reset translates into a reset to zero of the charges read, in other words in this case the charges accumulated in the integration capacitor 122. This wait time can advantageously prevent the electrical disturbances, which could be generated by the analogue-to-digital converter of the circuit 126, from disturbing the charge integrators.

After this reset, a second reading of the electrical charges outputted by the pixels 102 of the read line is implemented during a second measurement duration at a time $t_4$ and ending at a time $t_5$. In the example described here, the second measurement duration $t_5-t_4$ is equal to the first measurement duration $t_3-t_1$.

Unlike the first reading, which is partly carried out during the heating of the pixels 102, this second reading is implemented without heating the pixels 102 of the read line.

The switch 124 is open at time $t_4$. The integration then starts at the pyroelectric capacitor 104 of the pixels 102 of the read line, during the second measurement duration. Electrical charges continue to be generated by the pyroelectric capacitor of the pixel 102 during this second measurement duration, but these charges are here negative, as can be seen in FIG. 6, due to the fact that the pixels 102 are in a cooling phase. The value measured by this second reading is called $x_2$.

The contrast obtained during the second measurement is inverted in the same way, due to the linearity and the fact that the variations in temperature are similar for the pyroelectric pixels and the pixels with thermistors. For the pixels with thermistors, the contrast obtained can be written according to the equation:

$$\text{Contrast}\_t_5=a \cdot I_{t1} \cdot (\Delta T_{ridge\_t5}-\Delta T_{valley\_t5}).$$

The contrast obtained at the time $t_5$ has a negative value.

The subtraction carried out at the end of the two measurements therefore amounts to subtracting the contrasts of the two measurements, and is expressed by the equation:

$$\text{Contrast}\_t_5-\text{Contrast}\_t_3=a \cdot I_{t1} \cdot ((\Delta T_{ridge\_t5}-\Delta T_{ridge\_t3})-(\Delta T_{valley\_t5}-\Delta T_{valley\_t3})).$$

For each pixel 102 read, a difference between the two measured values $x_1$ and $x_2$ is then calculated. The calculation of this difference may be carried out outside of the reading circuit 116, in other words after having carried out an analogue-to-digital conversion of each of the measurement values $x_1$ and $x_2$.

In a variant, it is possible, after having carried out the first measurement $x_1$, to retain the analogue measurement value $x_1$ in the reading circuit 116, for example in a first capacitor of the reading circuit 116. After having carried out the second measurement $x_2$, the analogue measurement value $x_2$ is also retained in the reading circuit 116, for example in a second capacitor of the reading circuit 116. The analogue measurement values are then subtracted using the calculation of the difference between the two values $x_1$ and $x_2$, then the result of this subtraction is digitally converted and outputted by the reading circuit 116.

Due to the fact that the difference between the two pixels 102a, 102b is negative for the second reading $x_2$, whereas it is positive for the first reading $x_1$, the difference results in an even higher contrast, whereas a lower contrast would have been obtained if a single reading had been made between times $t_1$ and $t_5$.

In addition, the calculation of this difference makes it possible to remove, from the results obtained, the signals corresponding to the noise and which are not relevant for the capture performed, due to the fact that these signals have the same impact on the two readings carried out. The calculation of this difference makes it possible, in particular, to cancel at least a part of the fixed pattern noise (FPN) of the sensor 100, in other words any constant offset introduced at the output of the sensor 100, but also any constant leak current present in the sensor 100.

The subtraction carried out at the end of the two measurements therefore amounts here to adding the contrasts of the two measurements, while removing the effects of those stray signals which have the same impact on the first and second readings.

In general, the values of the different times $t_0$ to $t_5$, in other words the durations of the various phases of the method (heating, first reading, second reading) are adjusted to the function of the structure of the sensor 100.

The steps described above are repeated for the other lines of pixels of the sensor 100. In FIG. 7, these steps can be seen for a second line of pixels.

A wait time may occurred between the readings of two successive lines of pixels. If the sensor 100 comprises a passive array of pixels 102, in other words the pixels 102 do not comprise transistors making it possible to read the pixels (as is the case in FIG. 3), this wait time is used to allow the line of pixels which has just been read to cool.

In the method described above, the first measurement duration is equal to the second measurement duration. In a variant, it is possible that the two measurement durations are different from each other. In this case, the subtraction carried out between the two values $x_1$ and $x_2$ obtained during the two readings of each pixel 102 may be carried out by weighting these two values of the two signals according to the difference between the first and second measurement durations. In this case, by considering that the calculated difference is $x_1 - \alpha \cdot x_2$, the value of a being equal to the value of the ratio of the first measurement duration over the second measurement duration. This makes it possible to cancel the low-frequency stray signals which are considered constants despite the difference between the two measurement durations. In this case, the FPN it is no longer completely corrected by the calculation of this weighted difference, but it is possible to completely correct it by a factory calibration using software.

Figure 8A:
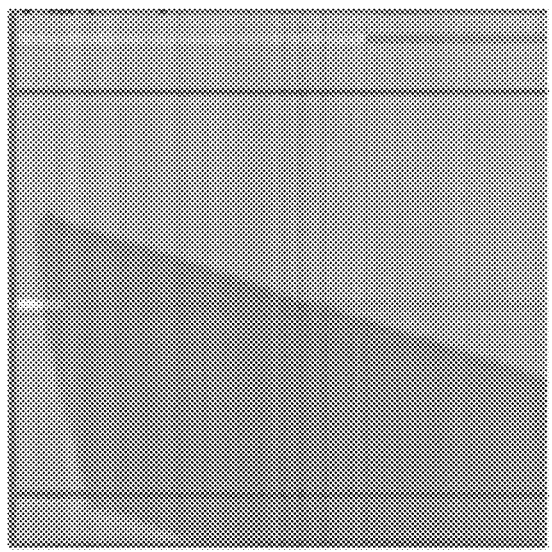
FIGS. 8A-8C and 9A-9C show images obtained respectively by considering the results of the first reading only, the second reading only and, and by subtracting the results of the second reading from those of the first reading.
Figure 8B:
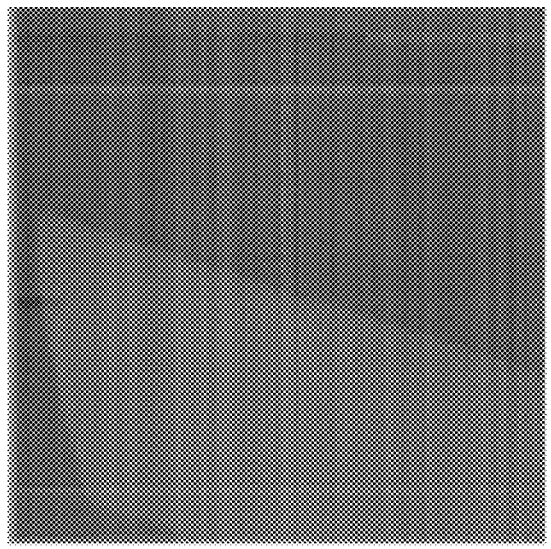
Figure 8C:
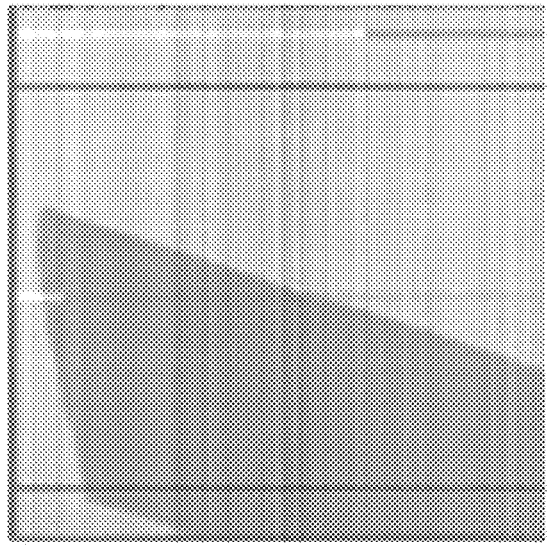

FIG. 8A shows an image calculated with only the values $x_1$ of the first reading. FIG. 8B shows an image calculated with only the values $x_2$ of the second reading (the contrasts are reversed between FIGS. 8A and 8B due to the fact that at the time of the second reading, the pixels are in a cooling phase whereas during the first reading, the pixels are in a heating phase). FIG. 8C represents an image calculated from the results of differences between the values of $x_1$ and the values of $x_2$. These figures clearly illustrate the fact that a better contrast is obtained for the image calculated from the results of differences between the values of $x_1$ and the values of $x_2$.

Figure 9A:
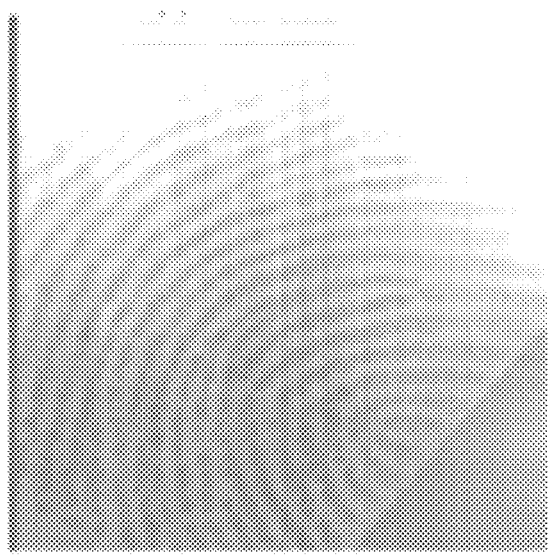
Figure 9B:
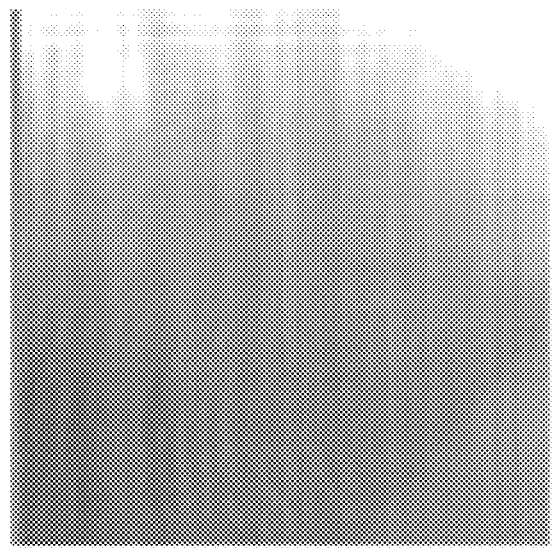
Figure 9C:
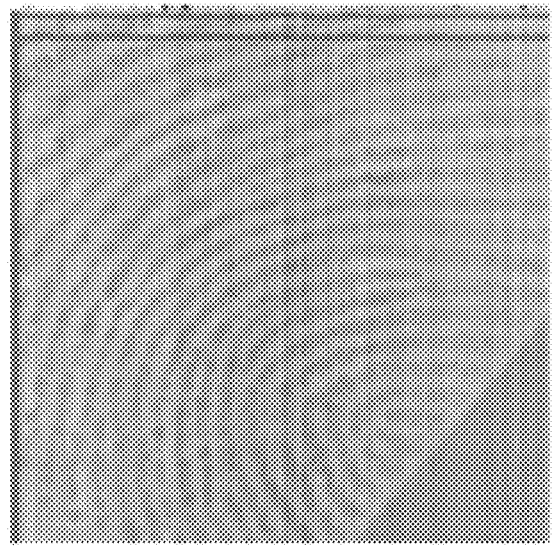

FIGS. 9A-9C show, in a manner analogous to FIGS. 8A-8C, images obtained respectively by considering the results of the first reading only, the second reading only, and by subtracting the results of the second reading from those of the first reading.

The subtraction carried out between the results of the first reading and those of the second reading, when the first and second measurement durations are identical, also makes it possible to a apply a filtering for which the normal of the transfer function H for frequency f, H(f) can be expressed in the form of the following equation:

$$H(f) = sinc(f \cdot T_{inf}) * 2 * \sin(2 \cdot \pi \cdot f \cdot \delta_t)$$

where:

$$sinc(x) = \frac{\sin(\pi x)}{\pi x},$$

$T_{int}$ the integration time, in other words the duration of one of the first and second readings, $\delta t$ half of the time $t_4 - t_1$, in other words half of the time between the start of the first reading and the start of the second reading.

Figure 10:
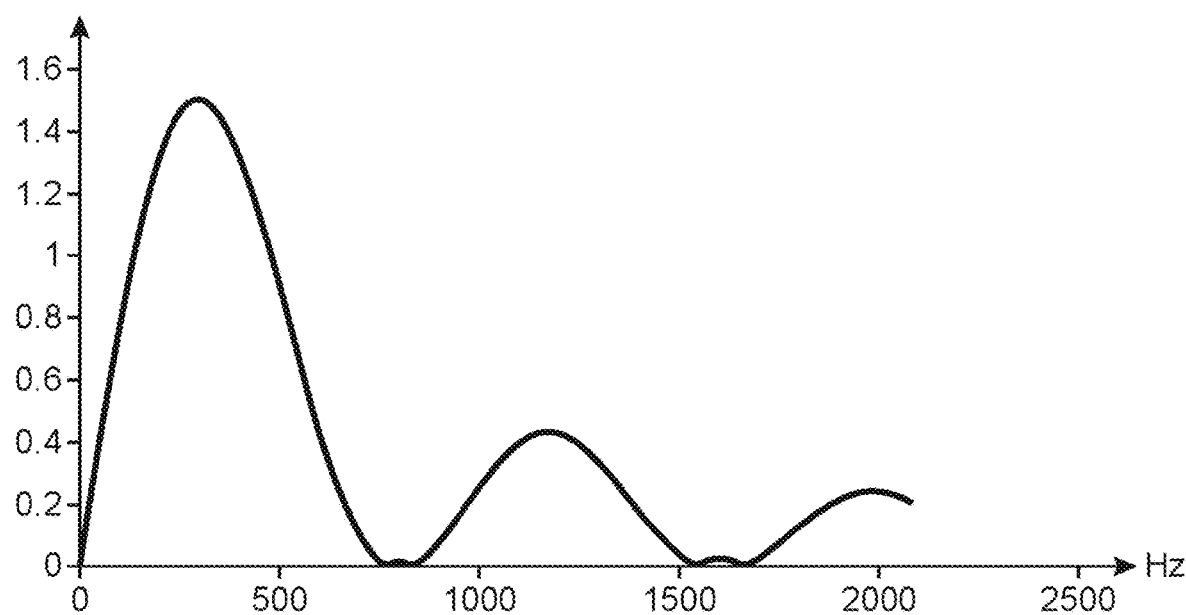
FIGS. 10 and 11 show filtering functions carried out during the implementing of a capture method according to one embodiment.

FIG. 10 shows the function H obtained when the duration of each of the two readings is the same at 1200 µs, with a wait time between each reading equal to 100 µs. With this filter, the stray signals due to the electromagnetic environment, the frequencies of which are between 50 Hz and 60 Hz, are attenuated by a factor of between 2 and 3. The frequencies of other passive or stray signals generated, for example, during the acquisition of an image of a fingerprint are less than approximately 10 Hz. Such a filter enables a very large attenuation of these stray signals (attenuation factor greater than 20, for example).

Figure 11:
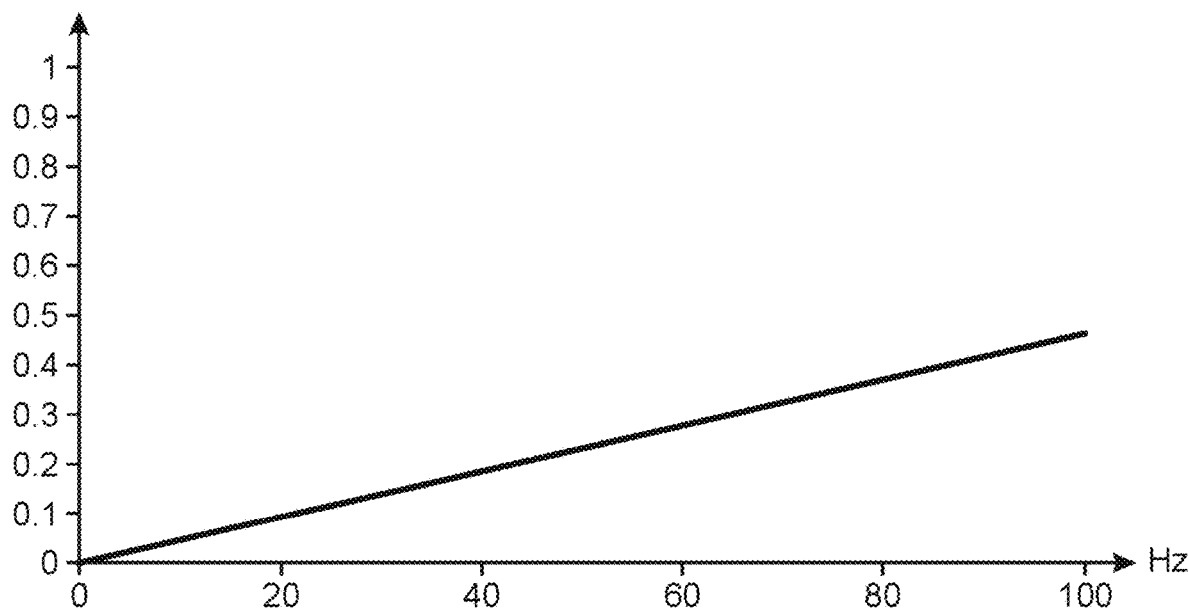

FIG. 11 shows the function H obtained when the duration of each of the two readings is the same at 700 µs, with a wait time between each of the reading equal to 50 µs. FIG. 11 shows that, in this case, the attenuation of signals with frequencies less than 10 Hz is even larger than that obtained in the configuration for which the filtering function is illustrated in FIG. 10.

For all the configurations described above, the above described method may be implemented by further carrying out a Correlated Double Sampling (CDS) operation. In this case, the values (charge or current) of the pixels are read at the start of each of the readings. These values are then subtracted at the end of each of the readings. Such an operation makes it possible to remove a large part of the fixed noise present in the pixels.

The value of a may be different to that of the ratio between the first measurement duration and the second measurement duration. Thus by modifying the value of the parameter α, it is possible to give more or less importance to one or other of the values $x_1$ and $x_2$, in other words to the measurement carried out largely during heating of the pixel or that carried out largely during cooling of the pixel. It is possible to have a parameter α of value greater than 1 or less than 1.

For example, in the case of a thermal pattern capture corresponding to that of a skin print, and with a first measurement duration equal to the second measurement duration, the choice of the value of the parameter α with a value greater than 1 allows greater importance to be given to the result of the second measurement carried out, at least in part, during the cooling of the pixel in the calculated difference $x_1-\alpha \cdot x_2$. Due to the fact that the measurement signal obtained during the cooling of the pixel involves deeper layers of skin thanks to the longer measurement duration, the heat having had more time to spread, it is thus possible to increase the importance of these deeper layers in the final result with respect to the first surface layers of skin. In a variant, by taking a value of the parameter $\alpha$ less than 1, a greater importance is given to the first measurement carried out for the surface layers of skin.

According to a second example, in the presence of constant noise in the form of a same quantity of undesired charges injected in each pixel, which does not depend on the acquisition duration, it may be judicious to have the value of the parameter $\alpha=1$ even when the durations of the first and second readings are not identical. Hence, this fixed noise is not present in the difference $x_1-\alpha \cdot x_2$.

In the special embodiment described above in connection with FIG. 2, the pixels do not comprise transistors for line selection and the addressing of the pixels is carried out, during the reading, by heating the desired line of pixels.

In a variant, it is possible for each pixel 102 to comprise a line selection transistor. The gate of such a line selection transistor may in this case be produced as a wire common to all the line selection transistors of the pixels of a same line and on which a selection signal is intended to be applied. A first of the source and drain electrodes of the line selection transistor may be connected to the active node 118 and a second of the drain and source electrodes of the selection transistor may be connected to an input of the reading circuit 116.

In such a variant the operation of the sensor 100 is similar to that previously described, apart from the fact that the line selection transistor is set to the on state during the reading of the line of pixels to which it belongs.

Figure 12:
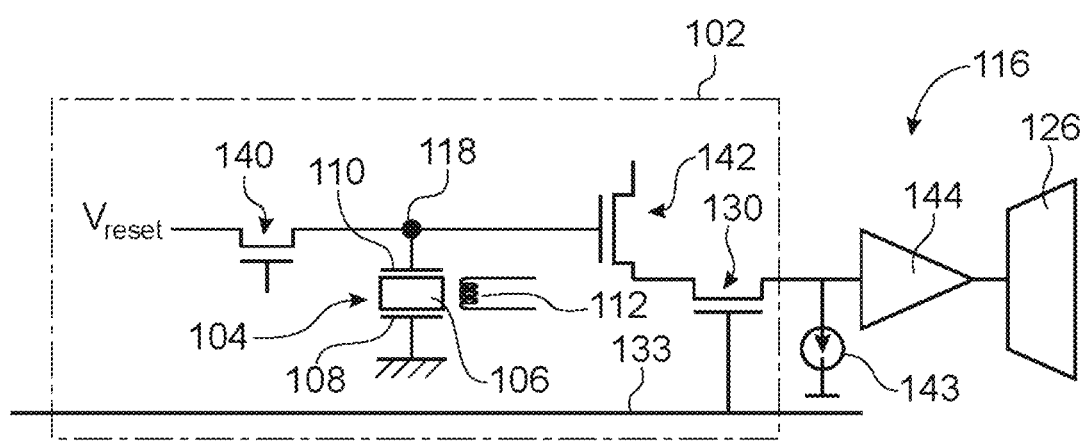
FIG. 12 shows a second exemplary embodiment of a reading circuit of a thermal pattern sensor according to one embodiment.

Other configurations of pixels may also be envisaged, such as that illustrated in FIG. 12 making it possible to read as a voltage the measurements of the pixels 102 of the sensor (so-called "active" pixel reading).

As in the exemplary embodiment described previously in connection with FIG. 3, each pixel 102 comprises the pyroelectric capacitor connected to the active node 118, hence a line selection transistor 130 controlled via a line selection line 133. Each pixel 102 is also provided with a reset transistor 140, one of the source and drain electrodes of which is connected to the node 118 and the other of the source and drain electrodes of which has a reset voltage $V_{reset}$ applied. A control signal to reset the pixel 102 is applied on the gate of the reset transistor 140. This reset makes it possible to set the electrical potential of the node 118 at a known value (in this case $V_{reset}$) at the start of the integration, and to drain the charges from the pyroelectric capacitor 104 once a reading is completed. As with the control of the pixel line selection transistor 130, the control of the reset transistor 140 may be common to an entire line of pixels 102.

Unlike the preceding exemplary embodiment, in which the node 118 is connected directly to the reading circuit 116, here the node 118 is connected to a gate of another transistor 142 forming a voltage follower and producing an amplification of the read signal, in other words the potential of the electrode 110, changing with the electrical charges generated by the pyroelectric capacitor 104 of the pixel 102. An electrical supply potential is applied on a first of the source and drain electrodes of the transistor 142 and a second of the source and drain electrodes of the transistor 142 is connected to the first of the source and drain electrodes of the transistor 130. A second of the source and drain electrodes of the transistor 130 is connected to the input of the reading circuit 116 formed by an inverting or non-inverting amplifier 144, of gain G. The output of the amplifier 144 is connected to the input of the analogue-to-digital converter 126. A current source 143 is also coupled to the input of the amplifier 144 in order to rapidly polarise the transistor 142 in an operating zone where it behaves as a voltage follower.

In this second embodiment, the reading of a pixel 102 is carried out by means of three transistors, for example MOS transistors. The reading is made in voltage and benefits from the local amplification provided by the follower transistor 142 which blocks the flow of charges on the active node 118. In TFT technology, the transistors may be produced from polysilicon or IGZO, for example.

This second exemplary embodiment produces a non-destructive reading of the charges generated by the pyroelectric capacitors. As the active node 118 has not been reset, the generated electrical charges are preserved.

In the examples described above, the heating is stopped during the first reading of the electrical charges. In other words, the time $t_2$ is between times $t_1$ and $t_3$. In a variant, it is possible that the heating is stopped during the second reading of the electrical charges, in other words after time $t_3$.

In general, the times $t_0$ to $t_5$ are chosen such that more than half of the heating duration is implemented during the first measurement duration and such that less than half of the heating duration is implemented during the second measurement duration.

The invention claimed is:

1. A method for capturing a thermal pattern by a sensor comprising a plurality of pixels each comprising at least one heat-sensitive measuring element, the sensor further comprising:
    at least one heating element configured to heat said at least one heat-sensitive measuring element of at least one pixel of the plurality of pixels during a measurement by said at least one heat-sensitive measuring element of said at least one pixel;
    at least one reading circuit configured to read the electrical charges outputted by said at least one pixel during a measurement by said at least one heat-sensitive measuring element of said at least one pixel;
    the method comprising, for each pixel of the plurality of pixels, the implementation of at least the following steps:
    heating said at least one heat-sensitive measuring element of said each pixel during a heating duration starting at a time $t_0$ and ending at a time $t_2$ later than the time $t_0$;
    first reading of the electrical charges outputted by said each pixel during a first measurement duration starting at a time $t_1$ and ending at a time $t_3$ later than the time $t_1$, and giving a first measurement value $x_1$ corresponding to the electrical charges read during the first measurement duration $t_3-t_1$;
    second reading of the electrical charges outputted by said each pixel during a second measurement duration starting at a time $t_4$, later than the time $t_3$, and ending at a time $t_5$ later than the time $t_4$, and giving a second measurement value $x_2$ corresponding to the electrical charges read during the second measurement duration $t_5-t_4$;
    calculating a difference $x_1-\alpha \cdot x_2$, with $\alpha$ corresponding to a positive real number,
    wherein more than half of the heating duration is implemented during the first measurement duration and less than half of the heating duration is implemented during the second measurement duration, and wherein the time $t_2$ occurs before the time $t_5$ such that the second reading of electrical charges outputted by said each pixel is implemented at least partly during a cooling of said each pixel.

2. The method according to claim 1, wherein the time $t_2$ is between the times $t_1$ and $t_3$.

3. The method according to claim 1, wherein the method and the sensor are configured to capture a fingerprint in contact with a capture surface of the sensor.

4. The method according to claim 1, wherein $\alpha$ is equal to the value of the ratio of the first measurement duration over the second measurement duration.

5. The method according to claim 1, wherein the first measurement duration is equal to the second measurement duration.

6. The method according to claim 1, further comprising, between the first and second readings, a reset of said at least one reading circuit, or a reset of said each pixel.

7. The method according to claim 1, wherein:
the first and second measurement values $x_1$ and $x_2$ are stored in said at least one reading circuit, and the difference $x_1 - \alpha \cdot x_2$ is calculated in said at least one reading circuit and then the result of this difference is outputted at the output of said at least one reading circuit, or
the first and second measurement values $x_1$ and $x_2$ are outputted consecutively at the output of said at least one reading circuit, and the difference $x_1 - \alpha \cdot x_2$ is calculated outside of said at least one reading circuit.

8. The method according to claim 1, comprising at least one of the following features:
the value of the heating duration $t_2 - t_0$ is between approximately 60 µs and 5000 µs;
each of the first and second measurement durations has a value between approximately 60 µs and 5000 µs;
the times $t_0$ and $t_1$ are chosen such that the time between the start of the heating and the start of the first reading is between approximately 0 and 200 µs.

9. The method according to claim 1, wherein said at least one heat-sensitive measuring element comprises at least one pyroelectric capacitor formed by at least one portion of pyroelectric material disposed between first and second electrodes.

10. The method according to claim 9, wherein one of the first and second electrodes of said at least one pyroelectric capacitor of said each pixel is formed by an electrically conductive portion common to all the pixels of a line to which said each pixel belongs.

11. The method according to claim 10, wherein the electrically conductive portion forming one of the first and second electrodes of all the pixels of a same line, also forms said at least one heating element of said all the pixels of a same line.

12. The method according to claim 10, wherein another of the first and second electrodes of said at least one pyroelectric capacitor of said each pixel is formed by an electrically conductive portion common to all the pixels of a column to which said each pixel belongs.

13. The method according to claim 1, wherein said at least one heat-sensitive measuring element comprises at least one thermistor or at least one diode, and/or in said each pixel, said at least one heat-sensitive measuring element forms said at least one heating element.

14. The method according to claim 1, wherein said at least one heating element is capable of heating, by the Joule effect, said at least one heat-sensitive measuring element of said each pixel, and/or wherein said at least one heating element is capable of emitting light for heating said at least one heat-sensitive measuring element.

15. A thermal pattern sensor comprising a plurality of pixels each comprising at least one heat-sensitive measuring element, the thermal pattern sensor further comprising:
at least one heating element configured to heat said at least one heat-sensitive measuring element of at least one pixel of the plurality of pixels during a measurement by said at least one heat-sensitive measuring element of said at least one pixel;
at least one reading circuit configured to read the electrical charges outputted by said at least one pixel during a measurement by said at least one heat-sensitive measuring element of said at least one pixel;
control means configured to implement the method according to claim 1.

* * * * *